United States Patent [19]

Yamaoka et al.

[11] Patent Number: 5,084,093
[45] Date of Patent: Jan. 28, 1992

[54] METHOD FOR MANUFACTURING MOLTEN PIG IRON

[75] Inventors: Hideyuki Yamaoka; Takaiku Yamamoto; Hiroaki Ishida, all of Ibaraki; Hiroyuki Ikemiya, Chiba, all of Japan

[73] Assignee: Sumitomo Metal Industries, Ltd., Osaka, Japan

[21] Appl. No.: 611,478

[22] Filed: Nov. 9, 1990

Related U.S. Application Data

[63] Continuation of Ser. No. 436,743, Nov. 15, 1989, abandoned.

[30] Foreign Application Priority Data

Jan. 31, 1989 [JP] Japan .................................. 1-21140

[51] Int. Cl.$^5$ ................................................ C21C 5/32
[52] U.S. Cl. .................................... 75/529; 75/532; 75/540
[58] Field of Search ........................ 75/529, 532, 540

[56] References Cited

U.S. PATENT DOCUMENTS

| | | | |
|---|---|---|---|
| 4,089,677 | 5/1978 | Spenceley | 75/51.5 |
| 4,304,598 | 12/1981 | Von Bogdandy | 75/51.5 |
| 4,329,171 | 5/1982 | Robert | 75/51.5 |
| 4,430,117 | 2/1984 | Spenceley | 75/51.5 |
| 4,537,629 | 8/1985 | Lazcano-Navarro | 75/51.2 |

FOREIGN PATENT DOCUMENTS 758246 10/1956 United Kingdom .

Primary Examiner—Peter D. Rosenberg
Attorney, Agent, or Firm—Burns, Doane, Swecker & Mathis

[57] ABSTRACT

A method for manufacturing molten pig iron is disclosed which comprises:

forming a packed bed of coke in a vertical furnace having a charging port in an upper portion thereof for charging raw materials and discharging gases, one or more primary tuyeres in its lower portion, and one or more secondary tuyeres in a wall of the furnace at a level above the primary tuyere, the packed bed of coke extending higher than the level of the primary tuyere;

forming a packed bed of scrap and iron ore atop the packed bed of coke to a level which extends above the secondary tuyere; and blowing an oxidizing gas through the primary tuyere and the secondary tuyere to melt and reduce the scrap iron and iron ore.

18 Claims, 7 Drawing Sheets

← POWDERED IRON ORE
← OXYGEN GAS
← POWDERED COAL
← OXYGEN GAS

METHOD FOR MANUFACTURING MOLTEN PIG IRON

This invention is a continuation of application Ser. No. 07/436,743, filed Nov. 15, 1989.

BACKGROUND OF THE INVENTION

This invention relates to a method for manufacturing molten pig iron in a vertical furnace using steel scrap and iron ore as sources of iron.

In the past, steel scrap or scrap iron (hereunder merely referred to as "scrap") has mostly been used as a raw material in electric furnaces. In the manufacture of steel using a converter, scrap has also been charged into molten pig iron as a coolant.

In recent years, however, there has been a surplus of scrap in the market, and there is a need for a more productive use for scrap. In an electric furnace, it is possible to employ scrap as the sole source of iron for steel making. However, in a converter, it is difficult to use large amounts of scrap, and generally it can constitute a maximum of approximately 20% of the iron source in a converter. Therefore, much research is being carried out in connection with developing techniques for employing large amounts of scrap as a raw material for the manufacture of molten pig iron or molten steel.

Japanese Published Unexamined Patent Application No. 57-198206 discloses a method and apparatus for manufacturing molten pig iron using scrap as a raw material. That method employs a converter equipped with a scrap preheating furnace. Scrap is charged into the converter, which already contains molten pig iron. A carbon-containing material (such as coke) and oxygen are blown into the converter. The carbon-containing material combusts, the heat of combustion melts the scrap, and pig iron is manufactured.

The above-described method for steel making in a converter has been developed so as to use scrap for 100% of its iron source. However, the economic practicality of this method depends on the price of scrap, which is very unstable. When the demand for scrap is high, its price rises, and in this case a method for manufacturing molten pig iron or molten steel using only scrap becomes uneconomical. Furthermore, scrap contains various alloying elements such as Ni, Cr, Cu, Sn, and Zn which are often difficult to remove from a melt during refining.

Another source of iron is iron ore, which is available in large quantities, is stable in price, and does not contain the above-described alloying elements which are difficult to remove from scrap. Therefore, it would be desirable to develop a method for manufacturing iron in a converter using scrap as a primary raw material and using iron ore as a secondary raw material which can be substituted for scrap.

One method which can employ large amounts of iron ore as an iron source in a converter is the smelting reduction method. FIG. 1 schematically illustrates an example of a furnace for use in the smelting reduction method. The illustrated furnace 1 is a vertical furnace such as a converter, and smelting furnace. An oxygen blowing lance 9 is disposed in the center of the furnace 1. Iron ore and coal are charged into the furnace 1 through a charging and discharging port 2 in the top of the furnace 1. In the smelting reduction method, the carbon in the coal which is charged into the furnace 1 is dissolved in a molten iron bath 3. When the iron ore is charged into the molten iron bath 3, it is melted by the molten iron, and the iron oxide (primarily $Fe_2O_3$) in the iron ore is reduced by the carbon in the molten iron bath 3. The reactions which take place are expressed by the following formula:

$$Fe_2O_3 + 3C \rightarrow 2Fe + 3CO - 108{,}090 \text{ Kcal/Kmol of } Fe_2O_3 \qquad (1)$$

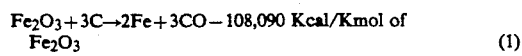

This reaction is a liquid phase reaction, so it is much faster than the solid phase reduction which takes place in a blast furnace, so even in a small furnace such as a converter, iron can be reduced highly efficiently.

The reaction expressed by formula (1) is highly endothermic. However, if the CO which is produced in the reaction is combusted in accordance with the following formula, a portion of the energy which is consumed in the reaction can be compensated for:

$$CO + 1/2 O_2 \rightarrow CO_2 + 67{,}590 \text{ Kcal/Kmol of CO} \qquad (2)$$

However, the $CO_2$ gas which is formed by the reaction of formula (2) produces an oxidizing atmosphere inside the furnace, so the oxygen potential of the molten phase is increased, and the molten reduction reaction of formula (1) is impeded. In order to compensate for the heat of reaction and prevent the formation of $CO_2$ gas, it is necessary to supply a carbon-containing material such as fine coal powder and $O_2$ gas so as to effect a partial oxidation reaction, such as the one expressed by the following formula:

$$C + 1/2 O_2 \rightarrow CO + 29{,}400 \text{ Kcal/Kmol of C} \qquad (3)$$

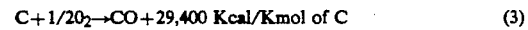

The heat from the high temperature CO gas which is generated can not be utilized, and the gas is simply discharged from the furnace, so the fuel utilization efficiency is poor.

Thus, in conventional methods for manufacturing pig iron, a processing furnace functions as no more than a melting furnace for scrap, or else it functions as a reducing furnace for an oxidizing reaction at the expense of fuel utilization efficiency, and there is currently no method for the manufacture of pig iron which reduces iron ore with high fuel utilization efficiency and uses scrap and iron ore as iron sources.

SUMMARY OF THE INVENTION

Accordingly, it is an object of the present invention to provide a method for the manufacture of pig iron which utilizes scrap and iron ore as sources of iron and which has a high fuel utilization efficiency.

In Japanese Published Unexamined Patent Application No. 64-75614, one of the present inventors disclosed the method shown in FIG. 2, in which the vertical furnace 1 is provided with lateral tuyeres 4, 5 and bottom tuyeres 6. Coke is charged into the furnace 1 through the charging and discharging port 2 to form a packed bed of coke 7 and then scrap is charged to form a packed bed of scrap 8 in the bed 7. The packed bed 8 extends to above the lateral tuyeres 5. An oxidizing gas or oxygen-containing gas such as oxygen (hereunder sometimes referred to as "combustion-sustaining gas") is blown into the furnace through the tuyeres 6 to burn the coke. The thus-formed gas mainly comprising carbon monoxide gas combusts within the packed bed of scrap 8 to melt the scrap. An oxidizing gas blown through the tuyeres 4, 5 supports post combustion, i.e., secondary combustion of the above-described CO-containing gas. Molten scrap drips down into the lower packed bed 7 where the molten scrap is carburized to form molten pig iron and is collected as a molten pig iron bath 9 at the bottom of the furnace 1. According to this method, the oxygen potential in a molten iron bath can be maintained at a low level, and carburization and sulfur removal can be promoted.

As a result of subsequent research, it was found that a strongly reducing region is formed in which molten iron oxide would be quickly reduced if an iron oxide is charged and melted.

Thus, the present invention was achieved based on the finding that there is a melting region and a strongly reducing region within the furnace.

The present invention is a method for manufacturing molten pig iron comprising:

forming a packed bed of coke in a vertical furnace having a charging port in an upper portion thereof for charging raw materials and discharging gases, one or more primary tuyeres in its lower portion, and one or more secondary tuyeres in a wall of the furnace at a level above the primary tuyere, the packed bed of coke extending higher than the level of the primary tuyere:

forming a packed bed of scrap and iron ore atop the packed bed of coke to a level which extends above the secondary tuyere: and blowing an oxidizing gas through the primary tuyere and the secondary tuyere to melt and reduce the scrap iron and iron ore.

DESCRIPTION OF THE PREFERRED EMBODIMENTS

Figure 1:
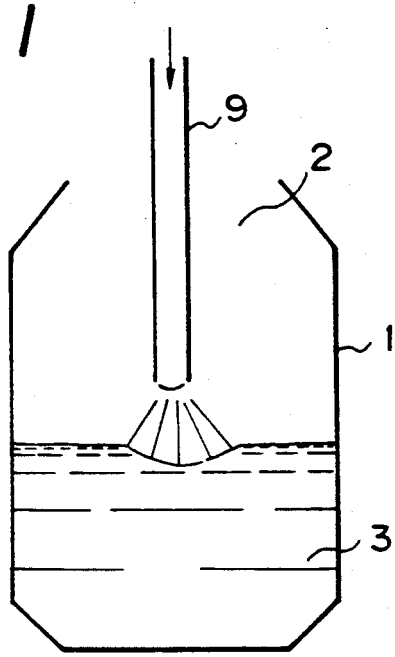
FIG. 1 is a schematic cross-sectional view of a conventional vertical furnace for carrying out molten phase reduction of iron ore.
Figure 2:
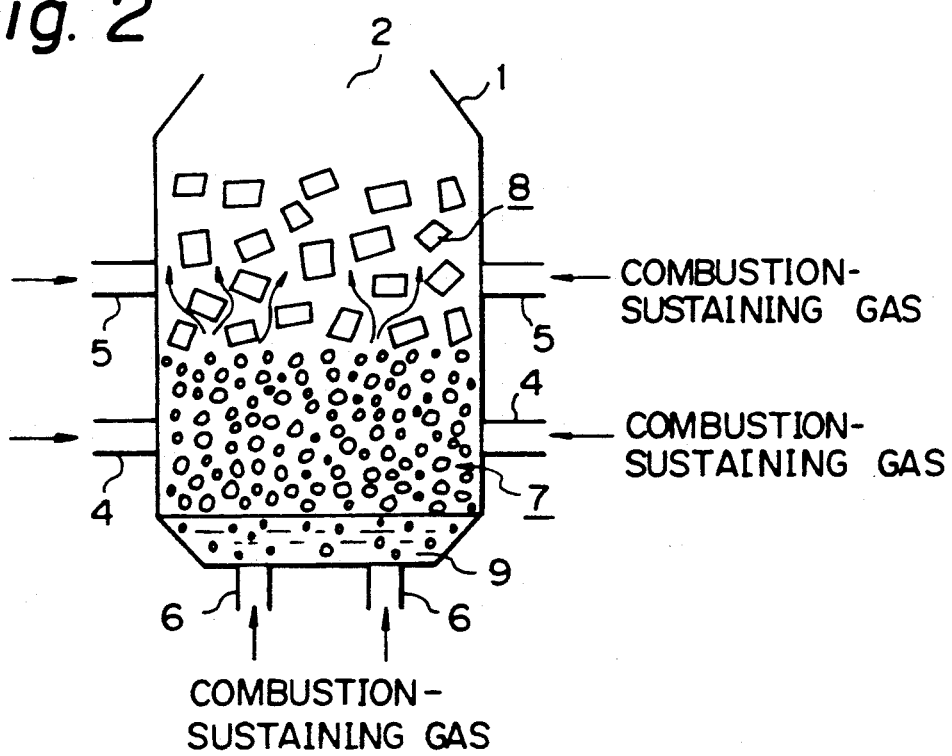
FIG. 2 is a schematic cross-sectional view of an example of a conventional vertical furnace for melting scrap.

The present invention will now be described in detail while referring to the accompanying drawings.

FIGS. 3a-3c schematically illustrate a vertical furnace 1 during three steps I-III, respectively, of a manufacturing method according to the present invention.

As shown in FIG. 3a, the converter 1 has a charging and discharging port 2 in its top through which scrap, iron ore, and coke are charged into the furnace and produced gases are discharged. Primary tuyeres 10 are connected to the lower portion of the furnace 1, and secondary tuyeres 11 are connected to the furnace 1 above the primary tuyeres 10. Melting in the furnace 1 is performed in the following three steps.

Step I (FIG. 3a)

First, coke and auxiliary raw materials are charged into the furnace 1 via the port 2 to form a packed bed 12 of coke which extends from the bottom of the furnace 1 to above the primary tuyeres 10. Next, scrap 13 and iron ore 14 are charged into the furnace 1 atop the packed bed 12 of coke to form a packed bed 15 of scrap 13 and iron ore 14 which extends to above the secondary tuyeres 11.

Step II (FIG. 3b)

An oxidizing gas, i.e., a combustion-sustaining gas is blown through the primary tuyeres 10 and the secondary tuyeres 11 to melt and reduce the scrap and the iron ore and form molten pig iron.

Step III (FIG. 3c)

The molten pig iron 16 and slag which are formed are discharged from the furnace 1.

The purpose of Steps I and II is to carry out partial oxidation of coke according to formula (3) in the packed bed 12 of coke by blowing an oxidizing gas through the primary tuyeres 10. In Steps I and II, a gas having CO as a major component is formed, and the packed bed 12 of coke is maintained at a high temperature by the combustion of coke. Furthermore, by blowing an oxidizing gas into the packed bed 15 of scrap and iron ore through the secondary tuyeres 11, the gas containing CO as a primary component which is formed in the lower packed bed 12 is made to undergo post combustion (sometimes hereinafter referred to as "secondary combustion").

As a result, scrap and iron ore are melted by the heat of post combustion in the upper packed bed 15. The thus-formed molten iron and molten iron oxide drip down to the lower packed bed 12 of coke by gravity.

The lower packed bed 12 of coke is heated to a high temperature by partial oxidation according to formula (3), so the molten iron oxide which drips down into the lower packed bed 12 quickly undergoes molten phase reduction to form molten iron. Furthermore, the molten iron which is formed is carburized by the high-temperature coke to form molten pig iron.

Figure 4:
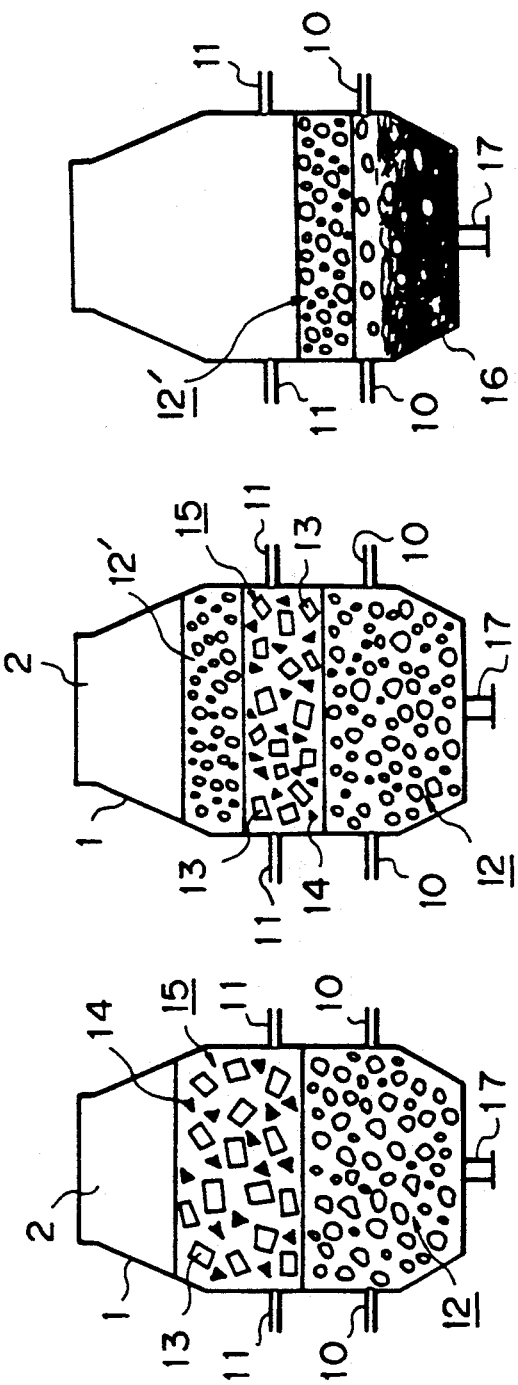
FIGS. 4a-4c are schematic cross-sectional views of another example of an apparatus for manufacturing pig iron according to the present invention.

The molten iron and slag which are formed are discharged from the furnace in Step III. Discharge can be carried out by tilting the furnace as is done with a steel-making converter. However, as will be discussed later and as shown in FIG. 4, discharge can be performed through a tapping port formed in the bottom of the furnace.

The amount of scrap and iron ore which are charged into the furnace in Step I is the amount which is expected to be melted in Step II, and the amount of coke which is charged into the furnace is the amount which is expected to be consumed in Step II. However, during the melting of Step II, it is not necessary that the amount of coke in the packed bed 12 be greater than the amount which is consumed. A suitable amount is such that the height of the packed bed 12 of coke extends to immediately below the secondary tuyeres. In this case, at the completion of the melting operation of Step II, coke will remain within the furnace. The remaining coke can be used the next time when Steps I-III are performed.

In this invention, primary tuyeres are preferably disposed in the bottom and/or side walls of a furnace, and one or more levels of secondary tuyeres are preferably disposed above the primary tuyeres.

According to the present invention it is essential to provide the primary and secondary tuyeres at a distance in a vertical direction. The direction between the primary and secondary tuyeres ($H_{1-2}$) in a vertical direction is preferably defined as $H_{1-2}/D \geq \frac{1}{4}$, wherein "D" stands for the inner diameter of a furnace. By using such a dimensional arrangement the existence of a strongly reducing region is made sure easily from a practical viewpoint.

In order to effectively utilize the heat of post combustion to melt the scrap and iron ore, the secondary tuyeres are preferably located as close as possible to the bottom of the packed bed of scrap and iron ore. By positioning the secondary tuyeres in this manner, when the scrap and the iron ore which are located just above the packed bed 12 of coke are melted by the heat of secondary combustion, the resulting molten iron and molten iron oxide immediately contact the coke, so they readily undergo molten phase reduction and are carburized.

In general, the more the combustion-sustaining gas, i.e., oxidizing gas is blown through the secondary tuyeres the more the heat is generated. However, when a large amount of oxygen remains in collected gases, there is a great possibility of explosion. Therefore, the oxygen supplying rate through the secondary tuyeres is preferably restricted to be a little smaller than that required to achieve the complete combustion of CO and $H_2$ gases generated within the furnace.

Some examples of scrap which can be used are all types of scrap steel, mold pig iron, and reduced iron.

In addition to iron ore or in place of iron ore, manganese ore, or chromium ore, or Mo- or Ni-containing ore may be charged for the manufacture of a molten pig iron which is suitable for making a high alloyed steel.

According to the method of the present invention, it is also effective to blow a fuel through the primary tuyeres together with a combustion-sustaining gas. In the packed bed 12 of coke, the fuel is partially oxidized by the oxidizing gas to form CO gas. Blowing an oxidizing gas and fuel through the primary tuyeres enables a decrease in the amount of coke which is necessary to melt the scrap and iron ore. The amounts of scrap and iron ore which are charged into the furnace can be increased by the amount that the coke is decreased.

As the proportion of iron ore in the iron source increases, the ratio of coke must be increased. As a result, the volume occupied by the coke increases, so when using a small furnace such as a converter, there is a lack of space in the furnace for the scrap and iron ore. By supplying a fuel through the tuyeres and decreasing the size of the packed bed of coke, adequate space within the furnace for the scrap and the iron ore can be guaranteed.

Examples of a fuel which can be blown through the primary tuyeres are liquid petroleum fuels such as heavy oil, kerosine, and LPG, gaseous fuels such as natural gas and hydrogen, and solid fuels such as coal, coke or residue of heavy oil. A solid fuel such as pulverized coal and/or granular coke can successfully be blown into the furnace together with an auxiliary fuel such as a hydrocarbon fuel including a liquefied petroleum gas, coke oven gas, $C_2H_4$, $C_2H_2$, $C_5H_{12}$, $C_3H_8$, and $C_4H_{10}$. As the energy for primary combustion is generated by the partial oxidation of carbon, a fuel with a high carbon content is preferable.

As explained previously, the method of the present invention may use scrap and lumps of iron ore as an iron source. As the proportion of lumps of iron ore (having a size which is roughly 1/50 that of the scrap) in the iron source increases, the mixing of the CO from the coke bed and the combustion-sustaining gas from the secondary tuyeres becomes poor, and the location at which secondary combustion starts shifts to the upper portion of the packed bed of scrap and iron ore, so there are cases in which the heat of the secondary combustion reaction can not be adequately utilized. In such cases, instead of charging lumps of iron ore through the charging port, it might be considered to blow granular iron ore into the packed bed of coke through the primary tuyeres. However, due to the heat absorbed by the melting and molten phase reduction of the granular iron ore which is blown in, the temperature of the packed bed of coke decreases, and there is the problem that the consumption of the combustion-sustaining gas and fuel which are blown through the primary tuyeres is greatly increased.

Therefore, in a preferred mode of the present invention, granular iron ore and a combustion-sustaining gas are blown through the secondary tuyeres instead of the primary tuyeres. As a result, the granular iron ore can be effectively melted with no increase in the consumption of combustion-sustaining gas or fuel.

The combustion-sustaining gas blown through the secondary tuyeres causes the secondary combustion of combustible gas which rises from the bottom of the furnace. This secondary combustion produces a high-temperature flame. If granular iron ore is blown through the secondary tuyeres together with the combustion-sustaining gas, the granular iron ore quickly melts upon contacting the high-temperature flame and forms fine liquid droplets. The resulting droplets rise within the packed bed of scrap together with the combustion gas. When the droplets strike one another, they form droplets of larger diameter which adhere to the scrap and then drip downwards inside the furnace, together with molten iron which is formed by the melting of the scrap. The droplets and the molten iron collect in the bottom of the furnace while being subjected to molten phase reduction.

In this manner, when granular iron ore is blown through the secondary tuyeres, it is possible to operate a furnace with about the same consumption of coke and combustion-sustaining gas as when lumps of iron ore are employed.

When the combustion-sustaining gas is oxygen, the temperature of post combustion can exceed 3000° C., so even coarse particles of iron ore having a particle diameter of around 5 mm are quickly melted. However, as the iron ore is usually transported by pneumatic piping, in order to decrease the resistance to transport and wear of the piping, the particles of iron ore preferably have a particle diameter of at most about 2 mm.

Some examples of combustion-sustaining gases which can be employed in the present invention are oxygen, oxygen-enriched air, and air. When a combustion-sustaining gas which has a small amount of nitrogen is employed, a pig iron having a lower content of nitrogen may be obtained. For this purpose the nitrogen content of a combustion-sustaining gas to be blown into the furnace through the tuyeres is preferably restricted to less than 40% by volume. An inert gas such as Ar may also be introduced into the furnace so as to cool the nozzle portions of the tuyeres. Furthermore, it is possible to prepare a molten pig iron with a lower content of hydrogen, e.g., 0.4 kg or less of hydrogen per ton of pig iron by employing a suitable combustion-sustaining gas.

As a general rule, the packed bed 12 of coke may also contain various auxiliary raw materials used in the manufacture of pig iron, such as limestone, serpentine, and silica stone.

Furthermore, a desulfurizing agent such as powdered CaO, $CaCO_3$, $CaF_2$ and Al may be blown into the furnace through the tuyeres provided in the bottom thereof together with a carrier gas to reduce the sulfur content of the resulting molten pig iron to a level of 0.005% or less.

Although not shown in the drawings, the furnace is preferably equipped with an apparatus such as that used in a steel-making converter which recovers the gas discharged from the opening at the top of the converter and which utilizes the waste heat. In such a case, it is possible to keep an atmosphere within the furnace under pressurized conditions so that the generated gas under pressure may be recovered.

Two problems may occur when carrying out the method of the present invention as described above. The first problem is that in the last stage of melting operations, there is a tendency for the thermal efficiency to decrease. In the last half of melting operations, the temperature of the scrap and the iron ore has increased, so high-temperature gas is discharged from the furnace. When the last stages of melting are reached, the volume of the packed bed of scrap and iron ore has decreased, and eventually the secondary tuyeres end up being exposed above the packed bed. At this time, the secondary combustion occurs in the empty space above the packed bed, so the thermal efficiency of the secondary combustion within the packed bed of scrap and iron ore greatly decreases. This has a bad effect on the overall fuel ratio and melting time.

The second problem is the presence of partially melted material in the last stages of melting and reducing. Even if a large number of tuyeres are provided in the bottom and side walls of the furnace, it is impossible to uniformly supply combustion-sustaining gas to the entire interior of the furnace, and there are inevitably regions of the inside of the furnace in which there is poor gas flow. These regions are frequently near the walls of a furnace between adjacent tuyeres. There is little contact between high temperature gas and the scrap and iron ore in these regions of poor gas circulation, so frequently the materials in these regions do not melt or take a long time to do so. This can lead to an increase in the melting time and a variation from batch to batch in the amount of molten pig iron which can be manufactured.

These two problems can be solved by a mode of the present invention which will be described while referring to FIGS. 4a-4c which illustrate a furnace during three steps of the method of the present invention.

The furnace which is employed in this mode is similar to that illustrated in FIGS. 3a-3c. The main difference is that it is equipped with a tapping port 17 for pig iron in either the bottom of the furnace or the lower portion of the side walls. The same reference numerals as in FIGS. 3a-3c are employed in FIGS. 4a-4c to indicate corresponding elements.

Molten phase reduction using the apparatus of FIGS. 4a-4c comprises the following Steps I-III.

Step I (FIG. 4a)

A packed bed 15 of scrap 13 and iron ore 14 is formed atop a packed bed 12 of coke to a level extending above the secondary tuyeres 11. The packed bed 12 of coke can be charged into the furnace 1 at the start of a melting run, or it can be a packed bed which remains from a previous melting run.

Step II (FIG. 4b)

The amount of coke which should be combusted during the next melting run is charged into the furnace 1 via the charging port 2, and an upper packed bed 12' of coke is formed atop the packed bed 15 of scrap 13 and iron ore 14. A combustion-sustaining gas is blown through the primary tuyeres 10 and the secondary tuyeres 11, and the scrap 13 and the iron ore 14 are melted and reduced to form molten pig iron.

Step III (FIG. 4c)

When the top of the upper packed bed 12' of coke which was prepared in Step II reaches a prescribed level higher than the primary tuyeres 10, a mixture 16 of molten iron and slag which was formed in Step II is tapped from the furnace 1 through the tapping port 17 while leaving solids (including the coke which was charged into the furnace in Step II) inside the furnace.

During the latter half of melting and reducing, the upper packed bed 12' of coke which is charged into the furnace in Step II is heated by high temperature gas which is discharged from the packed bed 15 of scrap and iron ore. This upper packed bed 12' then becomes the bottom packed bed 12 of coke for a new charge of scrap and iron ore.

If melting and reducing operations are repeatedly performed in the above-described manner, the sensible heat of the exhaust gas during the latter half of melting and reducing can be utilized the next time that melting and reducing are performed, resulting in an improvement in thermal efficiency.

The upper packed bed 12' of coke is charged into the furnace 1 during the melting and reducing step (Step II) rather than at the time that the scrap and iron ore are charged into the furnace, because when using a small furnace such as a converter, initially there is not sufficient room in the upper portion of the furnace for an upper packed bed 12'. During Step II, due to the melting of the scrap and the iron ore, the height of packed beds 12 and 15 has decreased enough for there to be room in the furnace for an upper packed bed 12' of coke. Furthermore, during the initial period of melting, the scrap and iron ore are not yet at a high temperature, so if coke were charged into the furnace at this time, it would not be effectively heated.

In Step III, regardless of whether the scrap and iron ore which were charged in Step I have been completely melted and reduced, when the upper packed bed 12' of coke reaches a prescribed level above the primary tuyeres 10, blowing is stopped and the molten pig iron and slag which have been formed are discharged from the furnace. Solids such as partially melted scrap and iron ore still remaining in the furnace are left in the furnace and used for the next melting and reducing run.

The present inventors performed repeated melting experiments in accordance with the above-described Steps I–III. It was found that if in each melting and reducing run the height of the upper packed bed 12' of coke when melting was terminated was maintained constant, the amount of iron scrap and iron ore remaining in the furnace at the completion of melting was substantially constant. Thus, each time the melting and reducing process is performed, if the same amount of scrap and iron ore are charged into a furnace and if blowing is stopped when the upper packed bed 12' reaches a fixed height, roughly the same amount of reduced molten pig iron and slag can be produced in each run.

With a conventional furnace, molten pig iron and slag are discharged by tilting the furnace. However, it is difficult to pour off only molten pig iron and slag without also removing solids such as partially melted scrap and iron ore. Therefore, according to the present invention, tapping of molten pig iron and slag is preferably carried out through a tapping port 17 formed in or near the bottom of the furnace.

If a combustion-sustaining gas continues to be blown through the secondary tuyeres until the completion of melting and reducing, secondary combustion will take place in the packed bed of coke in the latter stages of melting and reducing and the reaction given by formula (2) will occur. The secondary combustion will cause the coke to be heated, and when the coke temperature exceeds 1000° C., the $CO_2$ gas which is formed by the secondary combustion reacts with the coke and is converted back to CO in accordance with the following formula:

$$C + CO_2 = 2CO - 38200 \text{ Kcal/Kmol of C} \quad (4)$$

This is an endothermic reaction and is called carbon solution. Therefore, not only does this reaction wastefully consume coke, but by consuming energy, it hinders the melting of scrap and iron ore. Furthermore, the blowing of a combustion-sustaining gas through the secondary tuyeres is preferably stopped when the height of the upper packed bed 12' falls below the secondary tuyeres 11. Namely, in order to prevent the reaction of formula (4) from occurring, it is desirable to stop the blowing of a combustion-sustaining gas when the temperature of the coke exceeds 1000° C.

From a practical viewpoint it is advantageous that according to the present invention the temperature and the C and Si content of molten pig iron can be controlled precisely when bottom blowing of oxygen is employed together with oxygen blowing through the primary tuyeres which are provided in the wall portion of the furnace.

FIG. 4 shows the secondary tuyeres 11 installed on the furnace 1 at a single level. However, the secondary tuyeres 11 can be provided at a plurality of different levels along the height of the furnace 1. When such multi-level secondary tuyeres are disposed, a cooling agent may be blown through some of the secondary tuyeres into the furnace so as to suppress the occurrence of such a carbon solution reaction.

The substance which is blown through the secondary tuyeres can be varied in accordance with the movement of the various packed beds down the height of the furnace. For example, at the initial stage of melting, when the secondary tuyeres open onto the inside of the packed bed 15 of scrap and iron ore, a combustion-sustaining gas can be blown through the secondary tuyeres, and at a later stage of melting when the various beds have shifted downwards so that the secondary tuyeres 11 open onto the inside of the upper packed bed 12' of coke, powdered limestone and/or iron ore can be blown as a cooling agent through the secondary tuyere using an inert carrier gas. If the secondary tuyeres are installed at a plurality of levels, then at a given time, different substances may be blown through the secondary tuyeres at the different levels. Furthermore, when multi-level secondary tuyeres are provided, it is preferable that they are positioned in a staggered form with respect to the primary tuyeres.

According to a preferred embodiment of the present invention the flow rate of an exhuast gas at the discharging port is restricted to not more than 9.0 m/s and the lower limit thereof is defined as 0.3 m/s.

In the above-described method, molten pig iron and slag are tapped from the bottom of the furnace at the same time. It is therefore necessary to separate the two substances from one another subsequent to tapping. The pig iron and the slag can be passed through a runner and separated by gravimetric separation after which the slag can be removed with a skimmer. Alternatively, the molten pig iron and slag can be received in a vessel such as a torpedo car or a ladle, and then the slags can be removed using a slag dragger or a suction removal apparatus for slag. Other conventional separation methods can also be employed. However, the above-described separation methods have the problems that (1) they are time-consuming, (2) they require special equipment, (3) they are troublesome to carry out, and (4) they decrease the temperature of the molten pig iron.

The present inventors discovered that if a vertical furnace is equipped with a molten pig iron tapping port and a separate slag discharge port, when the depth of the molten pig iron in the bottom of the furnace is at least 20 cm, the molten pig iron and the slag can be separated extremely quickly. Furthermore, if a furnace is slightly tilted with a tilting mechanism, all of the slag in the furnace can be discharged.

According to another mode of the present invention, a furnace is equipped with a slag discharge port, a separate tapping port for molten pig iron, and a tilting mechanism for tilting the furnace. This furnace can be used for either continuous or batch operations. An example of such a furnace is shown in FIGS. 5 and 6.

As shown in these figures, a vertical furnace 1 is mounted on a tilting mechanism 20. A tapping port 21 for molten pig iron is installed on the bottom of the furnace 1, while a slag discharge port 22 is installed on the side wall of the furnace near its bottom. The structure of the furnace 1 is otherwise the same as that of the furnace of FIGS. 3 and 4.

Figure 5:
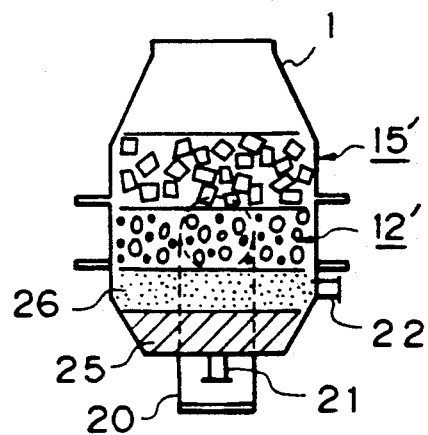
FIG. 5 is a cross-sectional view of a furnace equipped with a slag discharge port and a separate tapping port for molten pig iron as it would appear during the operation of the method of the present invention.

When the furnace 1 is in the position shown in FIG. 5, slag 26 can be discharged through the slag discharge port 22. As the upper bed 12' of coke descends, a new packed bed 15' of scrap and iron ore can be formed atop the upper packed bed 12', after which the molten pig iron 25 can be discharged through the tapping port 21. Then, the steps following Step I of FIG. 4a can be repeated to perform continuous melting and reducing.

Figure 6:
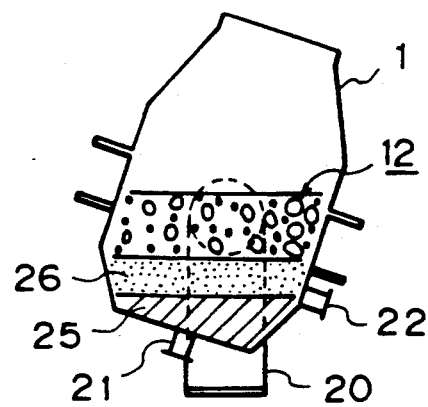
FIG. 6 is a schematic cross-sectional view of a furnace shown in FIG. 5, which is further equipped with a tilting means.

In the case of FIG. 6, at, for example, a step corresponding to Step III of FIG. 3c, the furnace 1 is tilted by the tilting mechanism 20 and the slag 26 is entirely discharged via the slag discharge port 22. Then, the furnace 1 is returned to an upright position, and the molten pig iron 25 is discharged from the tapping port 21. If another batch is to be prepared, Steps I-III of FIGS. 3a-3c can then be repeated.

In this manner, molten pig iron can be manufactured with a high thermal efficiency, and molten pig iron and slag can be easily separated from one another.

In the preceding examples of the present invention, the fuel which is employed comprises primarily lumps of coke. Lumps of coke perform the following functions. (1) In the lower portion of the furnace, due to combustion-sustaining gases such as air and oxygen, they produce the reaction of formula (1) and generate heat and CO. (2) The lumps of coke utilize the perceptible heat which is generated by the reaction of formula (1) and act as a reducing agent for the molten phase reduction of iron ore. (3) The packed bed of coke maintains the molten iron in spaces, and it acts as a spacer to prevent the partially melted scrap and iron ore in the upper portion of the furnace from falling downwards.

Pig iron contains a large amount of carbon, so it has a lower melting point than scrap, and particularly scrap containing a large amount of steel. Therefore, it is possible for molten pig iron and partially melted scrap to be present in the bottom of a furnace at the same time, and a packed bed of partially melted scrap and iron ore can act as a spacer for the molten pig iron. Thus, it is not always necessary to employ lumps of coke as a spacer.

Therefore, according to one mode of the present invention, an inexpensive carbon-containing fuel such as coal powder, coke powder, natural gas, or heavy oil is used as a fuel instead of expensive lumps of coke, resulting in a significant decrease in manufacturing costs.

When powdered fuel is blown into the furnace together with a combustion-sustaining gas and combusted, the amount of carbon in the powdered fuel (expressed as $C_f$: kg/hour) should be greater than the stoichiometric quantity to combine with the oxygen contained in the powdered fuel (expressed as $O_f$: kg/hour) and the oxygen in the combustion-sustaining gas (expressed as $O_g$: kg/hour) to form carbon monoxide. If there is an excess of carbon, there will be sufficient heat for the formation of carbon monoxide by the molten phase reduction reaction given by formula (1), and high-temperature, uncombusted carbon will be left over, so the formation of $CO_2$ and $H_2O$ can be prevented by the reactions of formulas (4) and (5).

$$H_2O + C = H_2 + CO - 28400 \text{ Kcal/Kmol of C} \quad (5)$$

The CO which is formed by the combustion of coke and the uncombusted carbon act as reducing agents to promote the reduction of the iron ore.

The carbon undergoes partial oxidation combustion. If complete combustion occurs according to the following formula, the carbon can not function as a reducing agent.

$$C + O_2 = CO_2 + 97000 \text{ Kcal/Kmol of } O_2 \quad (6)$$
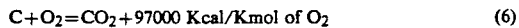

In this mode of the invention, the fuel is blown into the furnace through the primary tuyeres together with a combustion-sustaining gas. It is important to achieve a balance between the amount of carbon contained in the fuel and the amount of oxygen contained in the combustion-sustaining gas and the fuel.

As stated previously, incomplete combustion according to formula (1) takes place in the vicinity of the primary tuyeres, and uncombusted carbon must remain. Therefore, the values of $C_f$, $O_f$ and $O_g$ must satisfy the following inequality:

$$C_f/12 > O_f/16 + O_g/16 \text{ (Kmol/hour)}$$

In one mode of the present invention, as is done in a conventional blast furnace, an iron source and necessary raw materials are continuously charged into the furnace, molten pig iron is tapped continuously or periodically, and slag is removed continuously. In this case, powdered fuel is blown through the primary tuyeres together with a combustion-sustaining gas, heat is produced by the incomplete combustion described by formula (1), and melting and reduction of scrap and iron ore are promoted. On the other hand, at the level of the secondary tuyeres, due to the perceptible heat of the gas which rises from below and the secondary combustion of CO given by formula (2), the layer of scrap and iron ore is adequately preheated. The raw materials are charged into the furnace at a rate such that the height of the layer of raw materials is maintained at a prescribed level above the secondary tuyeres.

During melting carried out according to the method of the present invention, the charging of raw materials and the discharge of molten pig iron or slag can be carried out periodically, i.e., the present method can be performed as a batch process.

When the present method is performed as a batch process, when the top of the layer of partially melted scrap and iron ore reaches a prescribed level above the primary tuyeres, the molten pig iron and slag which have formed are separately discharged from the furnace via a tapping port and a slag discharge port while leaving the partially melted scrap and iron ore in the furnace. New scrap and iron ore are then charged into the furnace atop the already existing layer of partially melted scrap and iron ore. The layer of partially melted scrap and iron ore in the vicinity of the primary tuyeres has been heated, so the combustion of the carbon content of the fuel supplied together with the combustion-sustaining gas from the primary tuyeres progresses smoothly, so melting, reduction, and carburization take place rapidly. The new layer of scrap and iron ore extends to above the secondary tuyeres, so it is adequately preheated by heat from the secondary combustion of CO.

In the above-described method, the initial melting to prepare a layer of partially melted scrap and iron ore can be performed by any suitable method. One method which can be employed is to charge scrap and iron ore atop the previously-described lumps of coke, and to fire a fuel blown through the primary tuyeres for the preparation of a partially melted iron ore and scrap.

FIGS. 7a-7d are schematic cross-sectional views of a method in which "non-lump" fuel which is blown through the primary tuyeres is used instead of coke as a fuel and melting is continuously performed. The structure of the furnace is substantially the same as that of the furnace of FIGS. 4a-4c.

Figure 7A:
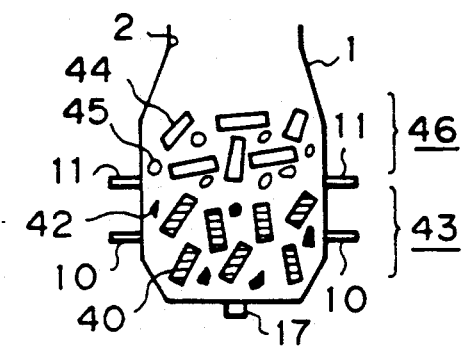
FIGS. 7a-7d are schematic cross-sectional views of a furnace during the continuous operation of the present invention in the case in which a packed layer of coke is not charged into the furnace.

FIG. 7a shows the state in which a new packed bed 46 of scrap 44 and iron ore 45 is formed atop an old packed bed 43 of partially melted scrap 40 and partially melted iron ore 42 inside a vertical furnace 1.

Figure 7B:
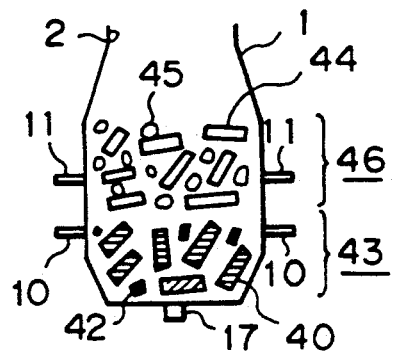

FIG. 7b shows the state in which a combustion-sustaining gas and a powdered fuel are blown into a packed bed 43 of partially melted scrap 40 and partially melted iron ore 42 through the primary tuyeres 10, while a combustion-sustaining gas is blown into a new packed bed 46 of scrap 44 and iron ore 45 through the secondary tuyeres 11. In this step, at the level of the primary tuyeres 10, the carbon in the fuel is partially combusted to form CO, the molten phase reduction of the partially melted scrap 40 and iron ore 42 progresses, and the remaining carbon dissolves in the molten pig iron to give the molten pig iron a high carbon content and a low melting point. On the other hand, at the level of the secondary tuyeres 11, the CO which is produced in the lower portions of the furnace undergoes secondary combustion with the combustion-sustaining gas, and the resulting heat preheats the newly added scrap 44 and iron ore 45.

The gas flame temperature in the primary tuyeres 10 is preferably at least 1500° C. in order to smoothly promote the melting and reduction of the scrap and iron ore.

Figure 7C:
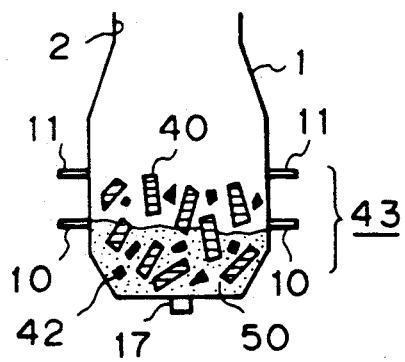

FIG. 7c shows the state in which the heating of FIG. 7b has progressed and a layer 50 consisting of a mixture of molten pig iron and slag had formed in the bottom of the furnace, the newly added packed bed 46 of scrap 44 and iron ore 45 has now become a packed bed 43 of partially melted scrap 40 and partially melted iron ore 42 which is present together with the layer 50 of molten pig iron and slag.

Figure 7D:
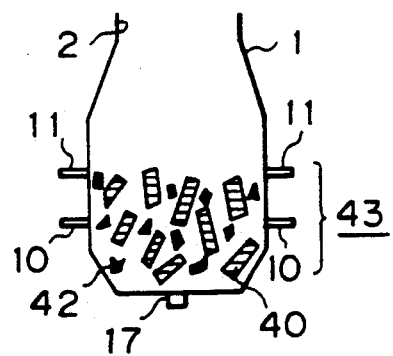

FIG. 7d shows the state in which the layer 50 of molten pig iron and slag has been discharged from the furnace through the tapping port 17, and a packed bed 43 of partially melted scrap 40 and partially melted iron ore 42 remains in the furnace. Subsequent to the state of FIG. 7d, new scrap and iron ore are charged into the furnace, and the condition of FIG. 7a is returned to. By a repetition of the states shown in FIGS. 7a-7d, continuous melting can be performed with extremely high thermal efficiency.

In the method of the present invention, instead of charging lumps of iron ore into the furnace through the charging port, it is possible to blow iron ore powder into the furnace through the secondary tuyeres together with a combustion-sustaining gas. If iron ore powder is supplied to the furnace in this manner, its use does not entail an increase in the consumption of either a combustion-sustaining gas or fuel.

Figure 8:
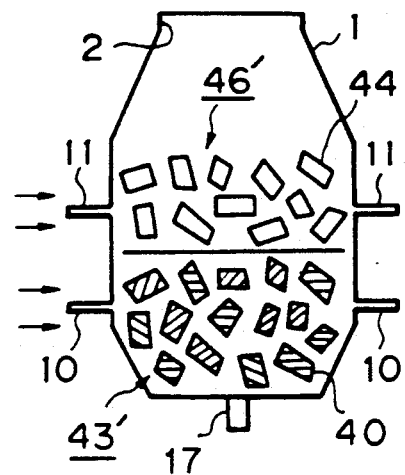
FIG. 8 is a schematic cross-sectional view of the furnace shown in FIG. 7 into which powdered iron ore is blown through secondary tuyeres.

FIG. 8 illustrates a furnace in which iron ore powder is used instead of lumps of iron ore. Melting is carried out using this furnace in the same manner as illustrated in FIG. 7. As shown in this figure, a combustion-sustaining gas such as oxygen gas and "non-lump" fuel such as powdered coal are blown through the primary tuyeres 10 into a packed bed 43' of partially melted scrap, and a combustion-sustaining gas and iron ore powder are blown through the secondary tuyeres 11 into a new packed bed 46' of scrap 44. At the level of the primary tuyeres 10, the carbon in the powdered fuel undergoes partial combustion according to formula (3) to form CO, the melting of the scrap and the reduction of molten iron oxide according to formula (1) progress, and the remaining C melts in the molten iron to give the molten iron a high carbon content and a low melting point. At the level of the secondary tuyeres, the CO which is formed in lower portions of the furnace undergoes secondary combustion with the combustion-sustaining gas according to formula (2), the new packed bed 46' of scrap is heated, and the iron ore powder which is blown through the secondary tuyeres 11 is melted.

Next, a number of working examples of the present invention will be described.

EXAMPLE 1

Figure 3:
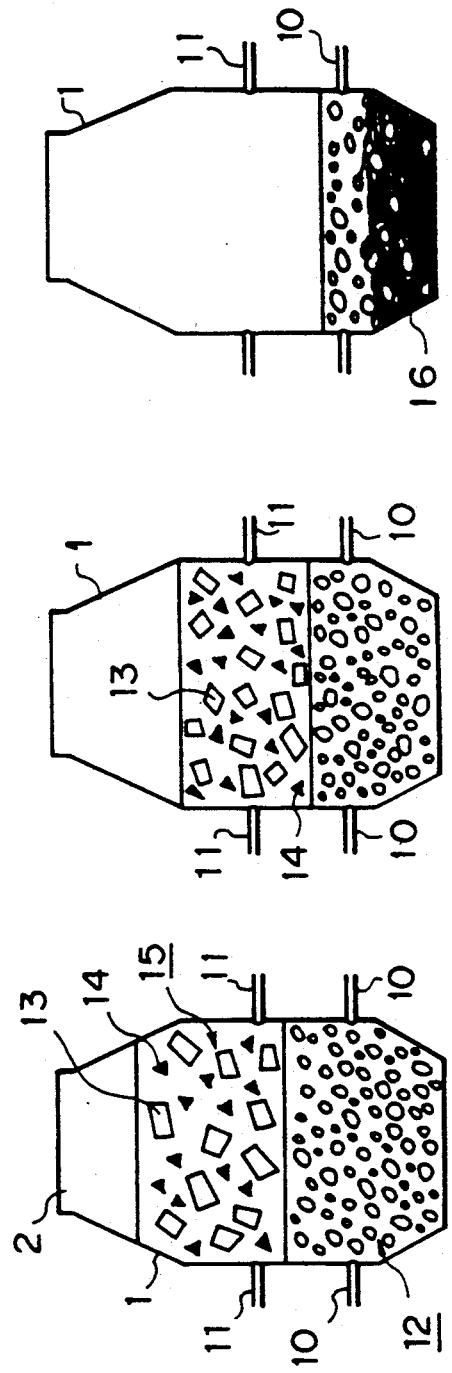
FIGS. 3a-3c are schematic cross-sectional views of an apparatus for manufacturing pig iron according to the present invention.

In this example, molten pig iron was manufactured in the manner illustrated in FIG. 3.

A converter having an inner diameter of 1.5 m, a height of 3.8 m from its bottom to the charging port in its top, an inner volume of 6.0 m$^3$, and a standard output of 8 tons per charge was employed. Four primary tuyeres were installed on the wall of the furnace 0.8 m above the bottom of the furnace at intervals of 90 degrees. Similarly, four secondary tuyeres were equally spaced around the outside of the furnace at a height of 1.2 m above the bottom of the furnace.

Scrap (purity of iron=99%) having maximum dimensions of 0.4 mm and a bulk density of 3500 kg/m$^3$ and lumps of iron ore (average dimensions=10-25 mm) having the composition shown in Table 1 were used as raw materials. Coke and finely powered coal having the compositions shown in Table 2 were used as fuels.

TABLE 1

| | (% by weight) | | | | | |
|---|---|---|---|---|---|---|
| T. Fe | FeO | SiO$_2$ | Al$_2$O$_3$ | CaO | MgO | Moisture |
| 66.4 | 0.4 | 1.85 | 0.54 | 0.2 | 1.1 | 2.0 |

TABLE 2

| | (% by weight) | | | | | | | |
|---|---|---|---|---|---|---|---|---|
| | C | H | O | SiO$_2$ | Al$_2$O$_3$ | CaO | MgO | Moisture |
| Coke | 88.0 | 0.5 | 0.0 | 6.9 | 3.5 | 0.3 | 0.3 | 2.0 |
| Coal | 75.0 | 4.3 | 8.0 | 7.6 | 3.8 | 0.3 | 0.3 | 2.0 |

The basic operating conditions were as follows. Oxygen was blown through the primary tuyeres as a combustion-sustaining gas at a rate of 1000 Nm$^3$/hour. At the same time, finely powdered coal was blown through the primary tuyeres at a rate of 1400 kg/hour. Oxygen was also blown through the secondary tuyeres as an oxidizing gas at a flow rate of 600 Nm$^3$/hour.

The order of operations was as follows. First, coke and auxiliary raw materials in the form of limestone, serpentine, and silica stone were charged into the bottom of the furnace to form a packed bed of coke extending to just below the secondary tuyeres. Scrap and iron ore in amounts sufficient to form 8 tons of molten pig iron were charged into the furnace atop the packed bed of coke. The coke ratio was at most 150 kg/ton, and 1.2 tons of coke were used per charge. Using 600 kg/m$^3$ as the bulk density of the coke, the volume of the packed bed of coke was estimated to be 2 m$^3$ and the height of the packed bed of coke from the bottom of the furnace was estimated to be 1.13 m.

The limestone, serpentine, and silica stone which were added as auxiliary raw materials maintained the fluidity of the slag which was formed and promoted the desulfurization of the molten pig iron. These auxiliary raw materials were added in amounts such that the resulting slag would contain 12.5 weight % of $Al_2O_3$ and 10.0% of MgO and so that $CaO/SiO_2$ would be 1.25.

Next, prescribed amounts of oxygen and finely powdered coal were blown through the primary tuyeres and a prescribed amount of oxygen was blown through the secondary tuyeres. Blowing was stopped when the molten phase reduction of the scrap and iron ore was completed, and the resulting molten pig iron and slag were recovered. The coke which still remained inside the furnace at the completion of melting was left in the furnace to be used during the next melting run. The amount of molten pig iron to be manufactured in one charge was 8 tons, and the utilization rate of iron ore was set at 0% and 25%. The utilization rate refers to the weight % of the iron source constituted by the iron ore and equals (weight of iron ore)/(weight of iron ore + weight of scrap). Melting went smoothly in both cases. The results are shown in Table 3. The case in which the utilization rate of iron ore was 0% was used as a reference example.

In this example, finely powdered coal was substituted for a portion of the coke, but it is not always necessary to employ coal.

As a comparative example, the furnace was converted into a top and bottom blowing converter. A prescribed amount of coke was charged into the furnace, and scrap and iron ore were charged atop the coke. The scrap and iron ore were melted while blowing oxygen and finely powdered coal through bottom-blowing tuyeres and blowing oxygen through a top-blowing lance. The flow rates through the bottom-blowing tuyeres were 1000 $Nm^3$/hour for oxygen and 1400 kg/hour for the finely powdered coal. The flow rate of oxygen through the top-blowing lance was 600 $Nm^3$/hour Thus, the flow rates through the bottom-blowing tuyeres were the same as for the primary tuyeres and the flow rate through the top-blowing lance was the same as for the secondary tuyeres in Example 1. The same raw materials and fuels were used as in the above-described example, and the auxiliary raw materials were added in amounts so as to form a slag having the above-mentioned composition. Melting was performed satisfactorily when the utilization rate of iron ore was 0%, but when the utilization rate was 25%, the reduction of molten iron oxide did not progress. It is thought that the oxygen which was blown through the top-blowing lance directly contacted the molten slag and impeded reduction. Therefore, the flow rate of oxygen through the lance was reduced to 350 $Nm^3$/hour in an attempt to promote reduction.

The results of Reference Example 1 and Comparative Example 1 are summarized in Table 3.

TABLE 3

| Process | | Comparative | Reference | Example 1 Invention |
|---|---|---|---|---|
| Iron Ore Ratio | (as Fe %) | 0 | 25 | 0 | 25 |
| Scrap | (kg/t) | 1005 | 774 | 955 | 716 |
| Iron Ore | (kg/t) | 0 | 391 | 0 | 362 |
| Lime Stone | (kg/t) | 47 | 159 | 41 | 84 |
| Serpentine | (kg/t) | 14 | 38 | 13 | 16 |

TABLE 3-continued

| Process | | Comparative | Reference | Example 1 Invention |
|---|---|---|---|---|
| Silica Stone | (kg/t) | 1 | 3 | 1 | 2 |
| Coke | (kg/t) | 66 | 170 | 63 | 138 |
| Pulverized Coal | (kg/t) | 135 | 471 | 109 | 185 |
| Fuel (total) | (kg/t) | 201 | 641 | 171 | 323 |
| Produced Pig Iron | (t/charge) | 8 | 8 | 8 | 8 |
| Melting Time | (min) | 46 | 160 | 37 | 63 |
| Oxygen | ($Nm^3$/t) | 154 | 450 | 124 | 210 |
| Recovered Gas | (Mcal/t) | 500 | 2715 | 405 | 917 |
| C of Pig Iron | (%) | 4.50 | 2.00 | 4.50 | 4.50 |
| Si | (%) | 0.00 | 0.00 | 0.01 | 0.00 |
| Mn | (%) | 0.75 | 0.20 | 0.85 | 0.65 |
| P | (%) | 0.015 | 0.030 | 0.015 | 0.035 |
| S | (%) | 0.045 | 1.550 | 0.035 | 0.050 |
| Cu | (%) | 0.063 | 0.047 | 0.060 | 0.045 |
| Sn | (%) | 0.032 | 0.024 | 0.031 | 0.023 |
| Ni | (%) | 0.040 | 0.030 | 0.040 | 0.030 |
| Exhaust Gas Temperature | (°C.) | 1585 | 1577 | 1046 | 956 |
| Exhaust Gas Utilization | (%) | 40 | 20 | 40 | 39 |
| Iron Yield | (%) | 95 | 95 | 99.5 | 99.5 |

From Table 3, it can be seen that in the Reference Example in which the utilization rate of iron ore was 0%, the fuel ratio, yield, and melting time were superior to those of the Comparative Example in which the utilization rate was also 0%, although the differences in the results were not large. However, the yield for Example 1 of the present invention in which the utilization rate was 25% was much higher than for the Comparative Example with the same utilization rate. Namely, in the Comparative Example, the fuel ratio increased to 640 kg/ton, the melting time exceeded 2 hours, and the sulfur content of the molten pig iron was very high. In contrast, in Example 1 of the present invention, the fuel ratio was only 323 kg/ton, and the melting time was only a little longer than 1 hour. The difference in the results was mainly due to the difference in the utilization rate of the heat of combustion of the fuel, as shown by the difference in the exhaust gas temperatures. When only scrap is melted, only enough heat is necessary to heat and melt the scrap, so to produce 1 ton of molten pig iron, at most 300 Mcal are needed. However, when the utilization rate of iron ore is 25%, approximately 300 Mcal more are required for molten phase reduction, so the amount of heat which is required is roughly doubled. Accordingly, it is important to effectively utilize the heat of combustion in order to prevent a worsening of the fuel ratio and the melting time. In order to solve this problem, in the present invention, secondary tuyeres are installed so as to open onto the packed bed of scrap and iron ore, post combustion is made to occur within the packed bed, and the resulting heat is utilized to melt the scrap and the iron ore. This results in the large difference in the fuel ratio and the melting time between Example 1 and the Comparative Example when the utilization rate of iron ore was 25%.

In the Comparative Example, the oxygen which was blown through the top-blowing lance caused post combustion in the top portion of the packed bed of scrap and iron ore. Accordingly, only the upper surface of the packed bed was heated, the effective utilization rate of the heat which was generated was low, and high-temperature gas was discharged from the furnace. Since the lower portions of the packed bed of scrap and iron ore were not heated by the post combustion, the molten iron oxide which was formed dripped downwards at a very slow rate, and molten phase reduction was obstructed. Therefore, it was necessary to reduce the amount of oxygen blown through the top-blowing lance at a utilization rate of 25%.

As the iron ore contained P, it can be seen that the molten pig iron produced by Example 1 with a utilization rate of 25% had a higher P content than did the molten pig iron produced by the Comparative Example with a utilization rate of 0%. However, the content of Cu, Sn, Ni and the like which came from the scrap and which are difficult to remove during refining was lower in the molten pig iron of Example 1 than in the Comparative Example with a utilization rate of 0%. Namely, the present invention provides the secondary benefit that elements contained in scrap can be diluted.

EXAMPLE 2

In this example, melting was performed in the manner illustrated in FIG. 4.

The same furnace as in Example 1 was employed, but a tapping port for molten pig iron was installed in the bottom of the furnace. Four primary tuyeres were installed on the furnace wall at intervals of 90 degrees at 1.4 meters above the bottom of the furnace, and four secondary tuyeres were mounted on the furnace wall at intervals of 90 degrees at 2.0 meters above the furnace bottom.

Scrap (purity of iron=99%) having maximum dimensions of 0.4 m and a bulk density of 3500 kg/m$^3$ and lumps of iron ore (dimensions 10-25 mm) having the composition shown in Table 1 were used as raw materials. The coke and finely powdered coal shown in Table 2 were used as fuels. During operation of the furnace, oxygen was blown through the primary tuyeres as an oxidizing gas at a rate of 1000 Nm$^3$/hour. Simultaneously, finely powdered coal was blown through the primary tuyeres at 1400 kg/hour. Oxygen was blown through the secondary tuyeres as an oxidizing gas at a rate of 600 Nm$^3$/hour.

Each charge was intended to manufacture 8 tons of molten pig iron. The utilization rate of iron ore was set at either 25% or 50%.

First, a packed bed of coke was formed in the furnace to a level above the primary tuyeres. Next, scrap and iron ore in an amount sufficient to form 8 tons of molten pig iron were charged into the furnace atop the coke. Melting was then begun. Prescribed quantities of oxygen and finely powdered coal were blown through the primary tuyeres, and oxygen was blown through the secondary tuyeres. When melting began, the height of the packed bed of scrap and iron ore began to fall. The height of this packed bed was measured using a sounding rod at intervals of 1 minute. When there was determined to be adequate room beneath the top of the furnace, additional coke was added atop the scrap and coke. At the same time, limestone, serpentine, and silica stone were added as raw materials in the same amounts as in Example 1. When the additional coke which was added descended to a height of 2.0 meters above the bottom of the furnace or 0.6 m above the primary tuyeres, i.e., when it reached the level of the secondary tuyeres, the blowing of oxygen and finely powdered coal through the primary tuyeres and the blowing of oxygen through the secondary tuyeres were both stopped.

Oxygen continued to be blown through the secondary tuyeres until the end of melting in order to stabilize the content of the exhaust gas during the later stages of melting. As a result, there was no evidence of the occurrence of the reaction of formula (4), and there was no remarkable increase in the temperature of the exhaust gas just before the upper packed bed of coke reached the level of the secondary tuyeres.

After melting and reducing were terminated, molten pig iron and slag were tapped through the tapping port in the bottom of the furnace.

The above-described series of operations were repeated for a number of runs. The maximum output of molten pig iron in a single run was 8.5 tons, the minimum was 7.5 tons, and the average deviation form the target value of 8 tons was 0.15 tons.

For reference, the procedure of Example 1 was repeated using the same furnace. Namely, melting was repeatedly performed with the premise that the scrap and iron were completely melted. During charging, a packed bed of coke was formed to the level of the secondary tuyeres, and then a packed bed of scrap and iron ore was formed atop the coke. During melting, no additional coke was charged into the furnace. However, during melting, it could not be determined whether the scrap and iron ore were completed melted, so the length of time for continuing melting and reducing were set according to experience.

The results of this example are shown in Table 4.

TABLE 4

| Process | | Corres. to Example 1 | | Example 2 | |
|---|---|---|---|---|---|
| Iron Ore Ratio | (as Fe %) | 25 | 50 | 25 | 50 |
| Scrap | (kg/t) | 716 | 478 | 716 | 478 |
| Iron Ore | (kg/t) | 362 | 723 | 362 | 723 |
| Lime Stone | (kg/t) | 84 | 128 | 73 | 113 |
| Serpentine | (kg/t) | 16 | 19 | 12 | 15 |
| Silica Stone | (kg/t) | 2 | 4 | 2 | 3 |
| Coke | (kg/t) | 138 | 212 | 133 | 196 |
| Pulverized Coal | (kg/t) | 185 | 256 | 139 | 206 |
| Fuel (total) | (kg/t) | 323 | 468 | 272 | 402 |
| Produced Pig Iron | (t/charge) | 8 | 8 | 8 | 8 |
| Deviation of Production | (t/charge) | 0.30 | 0.35 | 0.15 | 0.15 |
| Melting Time | (min) | 63 | 87 | 48 | 67 |
| Oxygen | (Nm$^3$/t) | 210 | 290 | 160 | 222 |
| Recovered Gas | (Mcal/t) | 917 | 1416 | 750 | 1202 |
| C of Pig Iron | (%) | 4.50 | 4.50 | 4.50 | 4.50 |
| Si | (%) | 0.00 | 0.00 | 0.00 | 0.00 |
| Mn | (%) | 0.65 | 0.45 | 0.65 | 0.45 |
| P | (%) | 0.035 | 0.060 | 0.032 | 0.057 |
| S | (%) | 0.050 | 0.055 | 0.045 | 0.050 |
| Cu | (%) | 0.045 | 0.023 | 0.045 | 0.023 |
| Sn | (%) | 0.023 | 0.012 | 0.023 | 0.012 |
| Ni | (%) | 0.030 | 0.015 | 0.030 | 0.015 |
| Exhaust Gas Temperature | (°C.) | 956 | 866 | 162 | 144 |
| Exhaust Gas Utilization | (%) | 39 | 39 | 39 | 38 |

The biggest difference between the two methods is the exhaust gas temperature. In the method of Example 2, the perceptible heat of exhaust gas was used to heat the upper packed bed of coke which was to be used during the next melting and reducing run. As a result, the fuel ratio and the melting time of Example 2 were superior to those of the Example corresponding to Example 1.

It was also found that by always stopping blowing when the upper packed bed of coke reached a prescribed level, variation in the output of molten pig iron among runs could be reduced.

EXAMPLE 3

In this example, a vertical furnace like that used in Example 1 was employed. It had a tapping port for molten pig iron at the center of its bottom. The method of Example 2 was repeated. Scrap (purity of iron=99%) having maximum dimensions of 400 mm and a bulk density of 3.6 tons/m$^3$ and iron ore powder having the composition shown in Table 1 and a particle diameter of at most 2 mm were used as sources of iron. The raw materials were used in an amount sufficient to manufacture 8 tons of molten pig iron.

First, in the manner of Example 2, a packed bed of coke was formed so that its top portion reached the level of the secondary tuyeres (1.2 meters from the bottom of the furnace). Scrap in an amount sufficient to form 6 tons of molten pig iron (75% of the total) was disposed atop the packed bed of coke.

Next, oxygen gas at a rate of 1000 Nm$^3$/hour and finely powdered coal at a rate of 1400 kg/hour were blown into the packed bed of coke through the primary tuyeres. Simultaneously, oxygen gas was blown into the packed bed of scrap via the secondary tuyeres at a rate of 600 Nm$^3$/hour. Iron ore powder in an amount sufficient to manufacture 2 tons of molten pig iron (25% of the total) was also blown into the scrap via the secondary tuyeres. As the packed bed of scrap descended, coke and auxiliary raw materials for the next run were added atop the packed bed of scrap to form an upper packed bed of coke. Limestone and serpentine were used as auxiliary raw materials. Blowing was stopped when the upper portion of the packed bed of scrap reached the level of the secondary tuyeres, and the resulting molten pig iron was removed via the tapping port. The melting conditions and the results are shown in Table 5.

COMPARATIVE EXAMPLE

Melting was performed in the same manner as in Example 3 except that the iron ore powder (sufficient to make 2 tons of molten pig iron) which was blown through the secondary tuyeres in Example 3 was instead blown through the primary tuyeres. The results are shown in Table 5.

From Table 5, it can be seen that in the Comparative Example in which iron ore powder was blown through the primary tuyeres, the consumption of fuel and oxygen was greatly increased. This is because the lower packed bed of coke compensates for the temperature decrease due to the heat absorbed by the reduction of the molten iron oxide, so increases in the consumption of fuel and oxygen are inevitable.

Thus, according to the present invention, it is possible to use iron ore powder instead of lumps of iron ore as a source of iron without an increase in the consumption of fuel or combustion-sustaining gas.

TABLE 5

| Process | | Comparative | Example 3 Run No. 1 | Example 3 Run No. 2 |
|---|---|---|---|---|
| Iron Ore Ratio | (as Fe %) | 25 | 25 | 25 |
| Scrap | (kg/t) | 720 | 742 | 735 |
| Lump Iron Ore | (kg/t) | 363 | — | — |
| Granulated Iron Ore | (kg/t) | — | 375 | 385 |
| Lime Stone | (kg/t) | 73 | 75 | 77 |
| Serpentine | (kg/t) | 13 | 13 | 13 |
| Silica Stone | (kg/t) | 2 | 2 | 2 |
| Coke | (kg/t) | 134 | — | — |
| Pulverized Coal | (kg/t) | 141 | 271 | 278 |
| Fuel (total) | (kg/t) | 275 | 271 | 278 |
| Produced Pig Iron | (t/charge) | 8 | — | 8 |
| Melting Time | (min) | 48.2 | — | 49.1 |
| Time per Charge | (min) | 68.2 | — | 69.1 |
| Production Rate | (t/d) | 169 | 244 | 167 |
| Oxygen | (Nm$^3$/t) | 161 | 158 | 164 |
| Recovered Gas | (Mcal/t) | 763 | 937 | 963 |
| C of Pig Iron | (%) | 4.50 | 2.00 | 2.00 |
| Si | (%) | 0.01 | 0.00 | 0.00 |
| Mn | (%) | 0.65 | 0.35 | 0.35 |
| P | (%) | 0.035 | 0.035 | 0.035 |
| S | (%) | 0.030 | 0.080 | 0.085 |
| Exhaust Gas Temperature | (°C.) | 162 | 164 | 274 |
| Exhaust Gas Utilization | (%) | 38.5 | 33.4 | 33.5 |
| Iron Yield | (%) | 99.5 | 99.0 | 99.0 |

EXAMPLE 4

The method of Example 1 was repeated with the exception that the furnace had a tilting mechanism, a tapping port for molten pig iron at the center of the furnace bottom, and a single discharge port for slag at a height of 0.73 m above the furnace bottom.

Oxygen at a rate of 1000 Nm$^3$/hour and finely powdered coal at a rate of 1400 kg/hour were blown into a packed bed of coke through the primary tuyeres and oxygen was blown at a rate of 600 Nm$^3$/hour through the secondary tuyeres.

Using the above-described furnace, 8 tons of molten pig iron per run were manufactured using the continuous method shown in FIG. 5 (Method A), the batch method shown in FIG. 6 (Method B), a method in which separation of molten pig iron and slag were performed in a separate vessel (Method C), and a method in which separation was performed in a runner (Method D). The separation rate of molten pig iron and slag, the increase in operating time, the temperature of the molten pig iron at the start of refining, and the refractory cost index were determined for each method.

In Methods C and D, the slag discharge port in the wall of the furnace was sealed after processing in accordance with Example 1 was completed, and molten pig iron and slag were discharged together from the tapping port in the furnace bottom.

Figure 9:
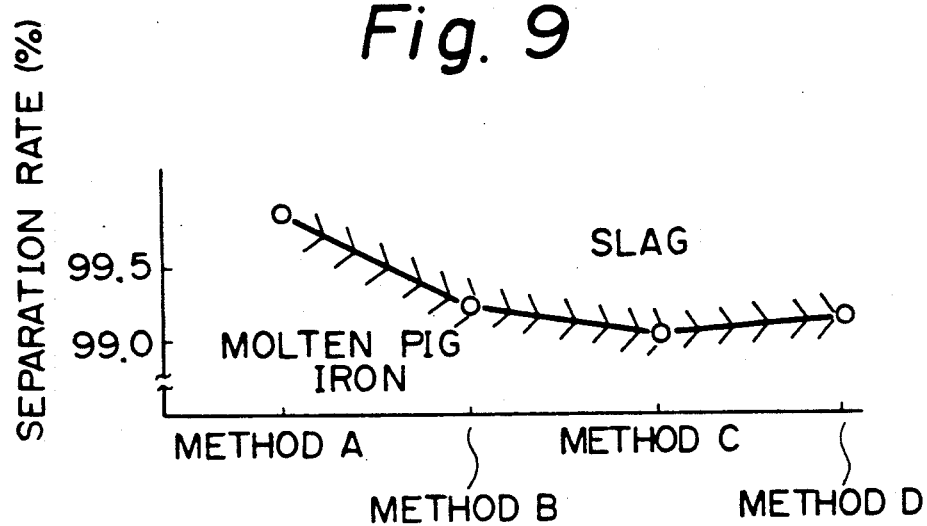
FIG. 9 is a graph of the separation rate of slag and molten pig iron according to the method of the present invention.
Figure 10:
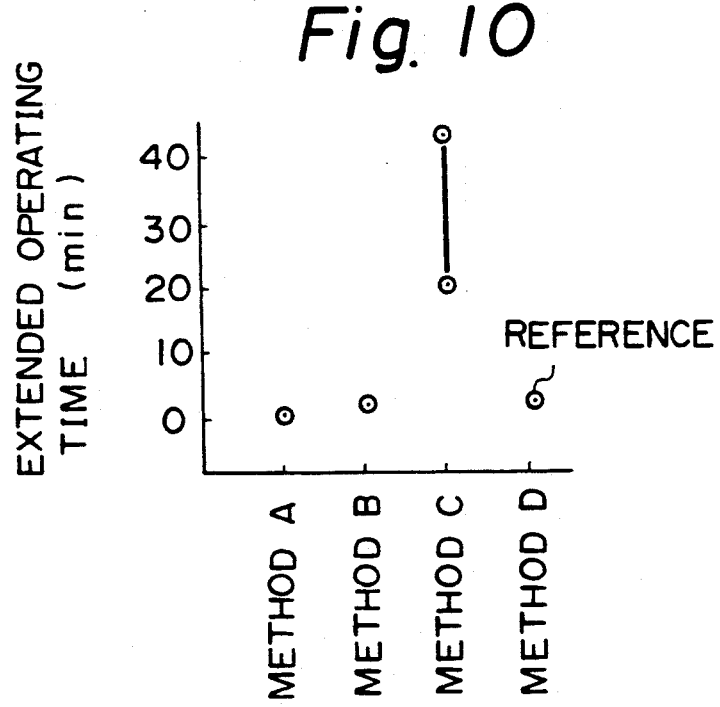
FIG. 10 is a graph showing the operating times for various methods.

The results are shown in FIGS. 9-12. FIG. 9 shows the separation rate of molten pig iron and slag. As is clear therefrom, the separation rate was higher for Methods A and B than Methods C and D. The separation rate was particularly high for Method A. FIG. 10 compares the operating times for the different methods with Method D as a reference. The operating times for Methods A and B were 20-40 minutes shorter than for Method C and were nearly the same as for Method D.

Figure 11:
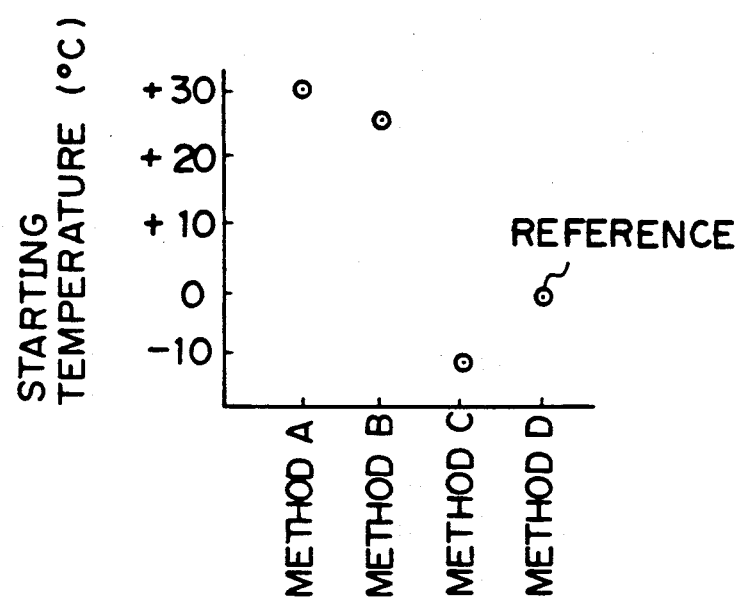
FIG. 11 is a graph showing the temperature at the start of refining for various methods.

FIG. 11 shows the temperature of the molten pig iron at the start of refining for each method with the temperature for Method D as a reference. The temperatures for Methods A and B were 20°-30° C. higher than for Method D. In other words, the drop in the temperature of the molten pig iron due to separation from the slag was small. In Method C, which took a long time for separation, the temperature of the molten pig iron was 10° C. less than the temperature in Method D.

Figure 12:
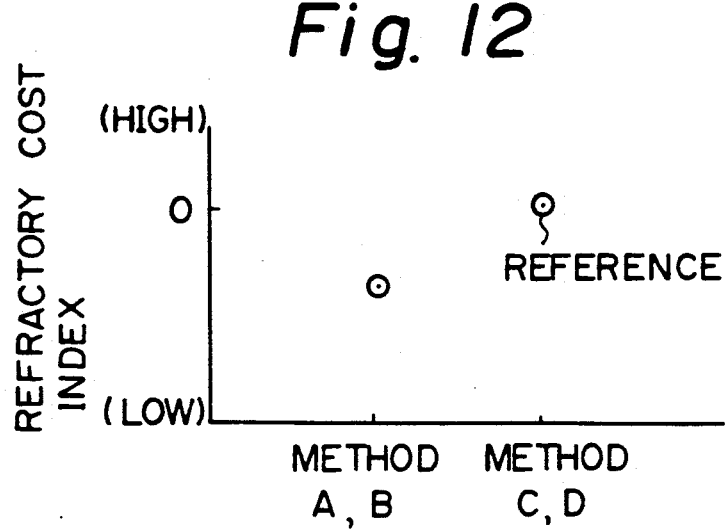
FIG. 12 is a graph showing the refractory cost index for the tapping port and the slag discharge port of a furnace employing the methods of the present invention.

FIG. 12 shows the refractory cost index of the tapping port and the slag discharge port for each method. It can be seen that the use of separate ports for the discharge of slag and molten pig iron results in a decrease in the refractory cost index. This is because if the molten pig iron and slag are discharged through separate ports, a slag-metal interface does not exist, so the wear of the refractory is reduced.

EXAMPLE 5

In this example, the method illustrated in FIGS. 7a-7d was performed as a batch process.

The furnace which was employed had a diameter of 1.5 meters, height of 3.6 meters from its bottom surface to the charging port in its top, and a volume of 6.0 m$^3$. Four primary tuyeres were mounted in the furnace wall at intervals of 90 degrees at a height of 1.4 meters above the furnace bottom, and four secondary tuyeres were mounted in the furnace wall at intervals of 90 degrees at a height of 2.0 meters above the furnace bottom. A tapping port for molten pig iron was formed in the center of the furnace bottom.

Scrap (purity of iron=99%) having maximum dimensions of 400 mm and a bulk density of 3500 kg/m$^3$, and lumps of iron ore having the composition shown in Table 1 and a particle diameter of 10–25 mm were used as an iron source.

Finely powdered coal having a particle size of 200 mesh or smaller and the composition shown in Table 2 was used as a fuel.

Melting and reducing were performed so as to manufacture 8 tons of molten pig iron per run. Iron ore was used in an amount sufficient to form 2 tons of molten pig iron (25% of the total).

The initial melting was performed according to the method of Example 1. After molten pig iron and slag had been once discharged, the method of this example was performed. Namely, when the top of the packed bed of scrap and iron ore descended to below the level of the secondary tuyeres, 5.91 tons of scrap and 2.98 tons of iron ore were charged into the furnace. The amounts of scrap and iron ore were selected so as to manufacture 8 tons of molten pig iron (T.Fe=98 weight %). At the same time, in order to maintain the fluidity of the slag and promote the desulfurization of the molten pig iron, auxiliary raw materials in the form of limestone, serpentine, and silica stone were added in amounts such that the basicity of the slag would be 1.25, its alumina content would be 12.5 weight % and its magnesia content would be 10.0 weight %.

Next, melting was begun. Oxygen as an oxidizing gas was blown through the primary tuyeres at a rate of 1000 Nm$^3$/hour and through the secondary tuyeres at 600 Nm$^3$/hour. At the same time, finely powdered coal was blown through the primary tuyeres. When using the finely powdered coal shown in Table 1, the stoichiometric ratio of carbon and oxygen in order to generate CO (the flow rate such that the chemical equivalent of carbon equals the chemical equivalent of oxygen) is 1 kg of finely powdered coal for 0.644 Nm$^3$ of oxygen. Therefore, in order for all the gas which is formed to be CO and H$_2$, 1552 kg/hour of finely powdered coal are adequate. However, in order to form uncombusted carbon for molten phase reduction and carburization, the amount of finely powdered coal was increased to 2247 kg/hour.

During blowing, the height of the packed bed of raw materials in the furnace was measured at intervals of 1 minute. When the top of the packed bed fell to a height of 2 meters above the furnace bottom, i.e., to just below the secondary tuyeres, the blowing of oxygen and finely powdered coal through the primary and secondary tuyeres was stopped.

The molten pig iron and slag which were formed were discharged through the tapping port, while the partially melted scrap and iron ore were left inside the furnace. The results are shown in Table 6.

EXAMPLE 6

In this example, a device for continuously charging scrap iron was mounted atop the furnace of Example 5 and continuous melting and reducing were performed.

First, a single melting run was performed in the manner of Example 1 and the resulting molten pig iron and slag were discharged from the furnace. Then, coke was charged into the furnace to a height of 1.8 meters above the furnace bottom so as to form a packed bed of coke to above the primary tuyeres. Next, scrap, iron ore, and auxiliary raw materials (limestone, serpentine, and silica stone) were charged into the furnace through the charging port in the top of the furnace to a height of 3.5 meters above the furnace bottom. Then, oxygen at a rate of 1000 Nm$^3$/hour and finely powdered coal at a rate of 1552 kg/hour were blown through the primary tuyeres. The rate of supply of the finely powdered coal was selected so that the ratio of the carbon in the finely powdered coal to the oxygen which was supplied at 1000 Nm$^3$/hour was a stoichiometric ratio for the formation of CO. Oxygen was blown through the secondary tuyeres at 600 Nm$^3$/hour and the scrap was melted. Scrap and iron ore were continuously charged through the top of the furnace so that the height of the packed bed of scrap and iron ore was always maintained at 3.5 meters above the furnace bottom. The weight ratio of scrap to iron ore was 3:1.

The tapping port was left open, and the molten pig iron and slag which were formed were continuously discharged from the furnace.

After the packed bed of coke and scrap had combusted and a steady state was reached in which the packed bed was melted down, the rate of blowing finely divided coal through the primary tuyeres was increased to 2755 kg/hour, the charging rates of scrap and iron ore were set at 7.5 tons/hour and 3.8 tons/hour, respectively, and the charging rates of the auxiliary raw materials limestone, serpentine, and silica stone were set at 760 kg/hour, 133 kg/hour, and 20 kg/hour, respectively.

In addition, the rate of blowing the finely powdered coal was adjusted empirically so that the content of FeO in the slag was at most 2.0 weight %.

The results are shown in Table 6.

For reference, melting according to Example 1 was also performed (Reference Example).

From Table 6, it can be seen that the carbon content of the molten pig iron was lower and that the sulfur content was higher for Example 5 than for the Reference Example (Example 1). This is thought to be because in Example 5, a packed bed of coke was not formed on the furnace bottom, so the reducing atmosphere was weak, and the carbon in the molten pig iron was consumed to effect molten phase reduction.

It can also be seen that the method of Example 5 used larger amounts of scrap and iron ore than did the Reference Example, but that the carbon content of the molten pig iron was smaller while the iron content was greater than for the Reference Example. There was no difference in the yield.

There was no great difference in the discharge gas temperature or the gas utilization rate, and the fuel utilization rate and the utilization rate of perceptible heat were about the same as for the Reference Example. There were also no great differences in the unit consumption of oxygen, the fuel ratio, or the melting time.

In Example 6 in which scrap and iron ore were continuously charged into the furnace, the discharge gas temperature was lower and the amount of heat which was wasted by discharge were lower than for the batch method of Example 5. Therefore, the fuel utilization amount (271 kg/ton) for Example 6 was roughly 18% less than for Example 5 (330 kg/ton).

TABLE 6

| Process | | Reference | Example 5 | Example 6 |
|---|---|---|---|---|
| Scrap | (kg/t) | 720 | 739 | 739 |
| Iron Ore | (kg/t) | 363 | 373 | 373 |
| Lime Stone | (kg/t) | 84 | 88 | 75 |
| Serpentine | (kg/t) | 16 | 17 | 13 |
| Silica Stone | (kg/t) | 2 | 2 | 2 |
| Coke | (kg/t) | 138 | 0 | 0 |
| Pulverized Coal | (kg/t) | 185 | 330 | 271 |
| Fuel (total) | (kg/t) | 323 | 330 | 271 |
| Produced Pig Iron | (t/charge) | 8 | 8 | — |
| Production Rate | (t/h) | — | — | 10.2 |
| Melting Time | (min) | 63 | 64 | — |
| Oxygen | (Nm$^3$/t) | 210 | 213 | 158 |
| Recovered Gas | (Mcal/t) | 917 | 1144 | 937 |
| C of Pig Iron | (%) | 4.50 | 2.00 | 2.06 |
| Si | (%) | 0.00 | 0.00 | 0.00 |
| Mn | (%) | 0.65 | 0.65 | 0.35 |
| P | (%) | 0.035 | 0.032 | 0.035 |
| S | (%) | 0.050 | 0.075 | 0.073 |
| Exhaust Gas Temperature | (°C.) | 956 | 820 | 164 |
| Exhaust Gas Utilization | (%) | 39 | 34 | 33 |
| Iron Yield | (%) | 99.5 | 99.0 | 99.0 |

EXAMPLE 7

In this example, continuous melting was performed in the same manner as in Example 6 except that the iron ore was in the form of a powder having a particle size of at most 2 mm. The furnace was the same as that employed in Example 1 and had a tapping port for molten pig iron formed at the center of the furnace bottom.

In a reference example, lumps of iron ore having the same composition as the iron ore powder and a particle size of roughly 10 mm were used. The Reference Example also used lumps of coke having the composition shown in Table 2 and a particle size of at least 20 mm.

Pure oxygen was blown through the primary and secondary tuyeres as an oxidizing gas.

First, a preliminary melting run was performed in the manner of Example 1. After discharging the resulting molten pig iron and slag through the tapping port and leaving a packed bed of partially melted scrap in the furnace, continuous melting operations were begun. A new packed bed of scrap was formed atop the packed bed of partially melted scrap. Oxygen at a rate of 1000 Nm$^3$/hour and finely powdered carbon at a rate of 1400 kg/hour were blown through the primary tuyeres, while oxygen at a rate of 600 Nm$^3$/hour and iron ore powder were blown through the secondary tuyeres. As the layer of scrap was consumed, additional scrap and auxiliary raw materials were charged through the charging port so as to always maintain the height of the layer of scrap iron at 3.5 meters above the furnace bottom. The rate of charging scrap into the furnace and the rate of blowing iron ore powder were adjusted so that the iron ore powder constituted 25% of the iron supplied to the furnace. i.e. scrap:iron ore = 3:1 based on Fe content A steady state was achieved at roughly 6 hours after the start of melting. At this time, the output of molten pig iron was 10.16 tons/hour, the charging rate of scrap was 7539 kg/hour, the blowing rate of iron ore powder was 3810 kg/hour, and the blowing rate of finely powdered coal was 2757 kg/hour. The rates of blowing of oxygen through the primary tuyeres and the secondary tuyeres were respectively 170.5 Kmol/hour and 172.3 Kmol/hour.

The results are shown in Table 7.

EXAMPLE 8

In this example, molten pig iron was manufactured by a batch method.

First, a preliminary melting run was carried out in the manner described in Example 7 until the top of the layer of partially melted scrap reached the secondary tuyeres. Then scrap in an amount sufficient to form 6 tons (75% of the total) of molten pig iron, (5888 kg of scrap, carbon content of molten pig iron assumed to be 2 weight %) and auxiliary raw materials were charged into the furnace. The auxiliary raw materials were limestone, serpentine, and silica stone. They were added in an amount so that the resulting slag would contain 12.5 weight % of $Al_2O_3$ and 10.0 weight % of MgO and so that the ratio of $CaO/SiO_2$ would be 1.25. Oxygen at a rate of 1000 Nm$^3$/hour and finely powdered coal were blown through the primary tuyeres, and oxygen at a rate of 600 Nm$^3$/hour and iron ore powder were blown through the secondary tuyeres. The amount of iron ore powder was such that the total amount of iron ore powder and scrap would be sufficient to manufacture 8 tons of molten pig iron. When the height of the layer of scrap fell to the level of the secondary tuyeres, blowing was stopped, and the resulting molten pig iron and slag were discharged through the tapping port. The partially melted scrap in the furnace was left in the furnace for the next melting run. The amount of finely powdered coal which was blown through the primary tuyeres was adjusted to be the chemical equivalent amount to combine with the total of the oxygen in the finely powdered coal, the oxygen blown through the primary tuyeres, and the oxygen in the iron ore powder blown through the secondary tuyeres to form CO.

The above procedures were repeated for a number of runs. It was found that during the third run subsequent to the preliminary run, the lumps of coke which had been used in the preliminary run had been completely consumed. After operations had stabilized, the melting time for each batch was 49 minutes. Finely powdered coal was blown through the primary tuyeres at 2720 kg/hour, so the total amount used per batch was 2227 kg, and iron ore powder was blown through the secondary tuyeres at 3771 kg/hour, so the total amount of iron ore used was 3080 kg. The total rate of supply of oxygen (the oxygen blown through the primary tuyeres plus the oxygen in the finely powdered coal plus the oxygen in the iron ore powder) was 169.6 Kmol/hour, and the rate of supply of carbon in the finely powdered coal was 170.0 Kmol/hour.

In a reference example, melting in batches was performed in the manner of Example 1 using scrap and lumps of iron ore as an iron source and using lumps of coke as fuel.

On top of a layer of lumps of coke remaining from the preceding batch, scrap and lumps of iron ore in an amount sufficient to manufacture 8 tons of molten pig iron were charged into a furnace (ratio of scrap to iron ore=3:1). Oxygen at a rate of 1000 Nm³/hour and finely powdered coal at a rate of 1400 kg/hour were blown through the primary tuyeres, and oxygen at a rate of 600 Nm³/hour was blown through the secondary tuyeres. As the layer of scrap descended within the furnace, lumps of coke and auxiliary raw materials for use in the next batch were charged into the furnace. Melting was stopped when the top portion of the layer of scrap fell to the level of the secondary tuyeres. The molten pig iron and slag which were formed were discharged from the furnace via the tapping port, and the packed bed of lumps of coke was left inside the furnace. The amount of coke which was charged into the furnace was adjusted so that the temperature of the molten pig iron would be 1450° C. Limestone, serpentine, and silica stone were used as auxiliary raw materials in order to maintain the fluidity of the slag and to the promote desulfurization of the molten pig iron. They were added in amounts such that the slag would contain 12.5 weight % of $Al_2O_3$ and 10.0 weight % of $MgO$ and so that $CaO/SiO_2$ would be 1.25.

When operations stabilized, the melting time for each batch was 48 minutes. Each batch employed 2904 kg of lumps of iron ore, 5760 kg of scrap, and 1069 kg of lumps of coke. The results of melting are shown in Table 7.

As can be seen from Table 7, the results for Example 8 (batch method) were substantially the same as the result of the Reference Example (batch method employing coke) with respect to melting time, oxygen consumption, and fuel ratio. Example 8 was somewhat inferior to the Reference Example with respect to the lower carbon content and higher sulfur content of the resulting molten pig iron. The reason for this difference between the two methods is that there was no packed bed of coke in the furnace bottom, so the reducing atmosphere was weak in Example 8.

However, Example 8 has the big cost advantage that it does not need to employ expensive lumps of coke or lumps of iron ore, so even though the composition of the molten pig iron is somewhat inferior to that of the Reference Example, the manufacturing costs of iron and steel using molten pig iron manufactured by the method of Example 8 are much less.

Example 7 used the same raw materials as Example 8 but used a continuous method rather than a batch method. Due to continuous operation, the speed of production of molten pig iron (tons/day) for Example 7 was much higher than for Example 8. The time required for charging raw materials and tapping the molten pig iron amounts to nearly 30% of operating time for batch operations, so continuous operations are greatly superior with respect to productivity.

TABLE 7

| Process | | Reference | Example 7 | Example 8 |
|---|---|---|---|---|
| Iron Ore Ratio | (as Fe %) | 25 | 25 | 25 |
| Scrap | (kg/t) | 720 | 742 | 735 |
| Lump Iron Ore | (kg/t) | 363 | — | — |
| Granulated Iron Ore | (kg/t) | — | 375 | 385 |
| Lime Stone | (kg/t) | 73 | 75 | 77 |
| Serpentine | (kg/t) | 13 | 13 | 13 |
| Silica Stone | (kg/t) | 2 | 2 | 2 |
| Coke | (kg/t) | 134 | — | — |
| Pulverized Coal | (kg/t) | 141 | 271 | 278 |
| Fuel (total) | (kg/t) | 275 | 271 | 278 |
| Produced Pig Iron | (t/charge) | 8 | — | 8 |
| Melting Time | (min) | 48.2 | — | 49.1 |
| Time per Charge | (min) | 68.2 | — | 69.1 |
| Production Rate | (t/d) | 169 | 244 | 167 |
| Oxygen | (Nm³/t) | 161 | 158 | 164 |
| Recovered Gas | (Mcal/t) | 763 | 937 | 963 |
| C of Pig Iron | (%) | 4.50 | 2.00 | 2.00 |
| Si | (%) | 0.01 | 0.00 | 0.00 |
| Mn | (%) | 0.65 | 0.35 | 0.35 |
| P | (%) | 0.035 | 0.035 | 0.035 |
| S | (%) | 0.030 | 0.080 | 0.085 |
| Exhaust Gas Temperature | (°C.) | 162 | 164 | 274 |
| Exhaust Gas Utilization | (%) | 38.5 | 33.4 | 33.5 |
| Iron Yield | (%) | 99.5 | 99.0 | 99.0 |

What is claimed is:

1. A method for manufacturing molten pig iron comprising:
   forming a packed bed of coke in a vertical furnace having a charging port in an upper portion thereof for charging raw materials and discharging gases, one or more primary tuyeres in its lower portion, and one or more secondary tuyeres in a wall of the furnace at a level above the primary tuyere, the packed bed of coke extending higher than the level of the primary tuyere;
   forming a packed bed of scrap and iron ore atop the packed bed of coke to a level which extends above the secondary tuyere; and
   blowing an oxidizing gas through the primary tuyere and the secondary tuyere to melt and reduce the scrap iron and iron ore.

2. A method as claimed in claim 1, wherein iron ore powder is blown through the secondary tuyere together with the oxidizing gas.

3. A method as claimed in claim 1, further comprising blowing a fuel through the primary tuyere together with the oxidizing gas.

4. A method as claimed in claim 3, wherein iron ore powder is blown through the secondary tuyere together with the oxidizing gas.

5. A method as claimed in claim 1, further comprising:
   forming a new packed bed of coke atop the packed bed of scrap and iron ore when the top of the packed bed of scrap and iron ore falls to the level of the primary tuyere; and
   stopping blowing when the top of the new packed bed of coke falls to the level of the primary tuyere;
   discharging molten pig iron and slag which have been formed from the furnace via a tapping port formed in the bottom of the furnace; and
   forming a new packed bed of scrap and iron ore atop the new packed bed of coke.

6. A method as claimed in claim 5, wherein iron ore powder is blown through the secondary tuyere together with the oxidizing gas.

7. A method as claimed in claim 5, wherein the step of blowing an oxidizing gas is performed continuously, and a fuel is blown continuously through the primary tuyere together with the oxidizing gas into the packed bed of scrap and iron ore to carry out continuous melting.

8. A method as claimed in claim 7, wherein iron ore powder is blown through the secondary tuyere together with the oxidizing gas.

9. A method for manufacturing molten pig iron comprising:
forming a packed bed of coke in a vertical furnace having a charging port in an upper portion thereof for charging raw materials and discharging gases, one or more primary tuyeres in a lower portion of a wall of the furnace, one or more secondary tuyeres in a wall of the furnace at a level above the primary tuyere, a tapping port for molten pig iron formed in a lower portion of the furnace, a slag discharge port formed in a wall of the furnace at a level above the tapping port, and a tilting mechanism for tilting the furnace, the packed bed of coke extending higher than the level of the primary tuyere;
forming a packed bed of scrap and iron ore atop the packed bed of coke to a level which extends at least to the secondary tuyere;
blowing an oxidizing gas through the primary tuyere;
blowing an oxidizing gas through the secondary tuyere; and
discharging molten pig iron and slag which have formed in the furnace and separated from one another by natural separation via the tapping port and the slag discharge port, respectively.

10. A method as claimed in claim 9, further comprising tilting the furnace using the tilting mechanism when the level of the slag is higher but the level of the molten pig iron in the furnace is lower than the slag discharge port.

11. A method as claimed in claim 9, further comprising:
forming a new packed bed of coke atop the packed bed of scrap and iron ore when the top of the packed bed of scrap and iron ore falls to the level of the primary tuyere and partially melted scrap and iron ore still remain within the furnace;
blowing an oxidizing gas through the primary and secondary tuyeres;
stopping blowing when the top of the new packed bed of coke falls to the level of the primary tuyere;
discharging molten pig iron and slag which have been formed from the furnace via the tapping port while leaving coke and other solids within the furnace;
forming a new packed bed of scrap and iron ore atop the new packed bed of coke; and
recontinuing blowing after forming the new packed bed of scrap and iron ore.

12. A method as claimed in claim 9, wherein the new bed of scrap and iron ore is formed while discharging molten pig iron and slag from the tapping port, and further comprising:
maintaining the top of the packed bed of scrap and iron ore above the level of the secondary tuyere; and
blowing an oxidizing gas together with a fuel through the primary tuyere to carry out continuous melting.

13. A method for manufacturing molten pig iron comprising:
forming molten pig iron containing partially melted solids in a vertical furnace having a charging port for charging raw materials and discharging gases in its upper portion, one or more primary tuyeres in a lower portion of a wall of the furnace, one or more secondary tuyeres in a wall of the furnace at a level above the primary tuyere, and a tapping port for molten pig iron in the bottom of the furnace;
blowing an oxygen-containing oxidizing gas and a carbon-containing fuel through the primary tuyere;
blowing an oxygen-containing oxidizing gas through the secondary tuyere; and
adjusting the amount of carbon-containing fuel which is blown through the primary tuyere such that the amount of carbon which is blown into the furnace is more than the stoichiometric amount necessary to combine with the oxygen in the carbon-containing fuel and the oxygen in the oxygen-containing oxidizing gas which is blown through the primary tuyere to form carbon monoxide.

14. A method as claimed in claim 13, wherein the step of forming molten pig iron containing partially melted solids comprises:
forming a packed bed of coke which extends higher than the level of the primary tuyere;
forming a packed bed of scrap and iron ore atop the packed bed of coke to a level which extends above the secondary tuyere; and
blowing an oxidizing gas through the primary tuyere and the secondary tuyere to form a layer of partially melted scrap and partially melted iron ore.

15. A method as claimed in claim 13, further comprising:
discharging molten pig iron and slag which have formed from the tapping port in the furnace bottom; and
charging scrap and iron ore through the charging port at a rate to maintain the top of the packed bed of scrap and iron ore at a level above the secondary tuyere,
whereby melting and reducing are performed continuously.

16. A method as claimed in claim 13, further comprising blowing iron ore powder through the secondary tuyere together with the oxidizing gas.

17. A method for manufacturing molten pig iron comprising the steps of:
(a) forming a packed bed of coke in a vertical furnace having a charging port in an upper portion thereof for charging raw materials and discharging gases, one or more primary tuyeres in its lower portion, and one or more secondary tuyeres in a wall of the furnace at a level above the primary tuyere, the packed bed of coke extending from the furnace bottom to higher than the level of the primary tuyere;
(b) forming a packed bed of scrap and iron ore atop the packed bed of coke to a level which extends above the secondary tuyere;
(c) blowing an oxidizing gas through the primary tuyere and the secondary tuyere to melt and reduce the scrap and iron ore;
(d) forming a new packed bed of scrap and iron ore atop partially melted scrap and partially melted iron ore which were partially melted in step (c);

(e) blowing an oxygen-containing oxidizing gas and a carbon-containing fuel through the primary tuyere into the partially melted scrap and partially melted iron ore, blowing an oxygen-containing oxidizing gas through the secondary tuyere into the new packed bed of scrap and iron ore, and adjusting the amount of carbon-containing fuel which is blown through the primary tuyere such that the amount of carbon which is blown into the furnace is more than the stoichiometric amount necessary to combine with the oxygen in the carbon-containing fuel and the oxygen in the oxygen-containing oxidizing gas which is blown through the primary tuyere to form carbon monoxide;

(f) discharging molten pig iron and slag through the tapping port while leaving partially melted scrap and partially melted iron ore in the furnace when the top of the new packed bed of scrap and iron ore falls to a prescribed level above the primary tuyere; and (g) repeatedly performing steps (d) through (f).

18. A method as claimed in claim 17, wherein iron ore powder is blown through the secondary tuyere together with the oxidizing gas.

* * * * *